Sept. 22, 1936.  E. C. HOELSCHER  2,054,978
VALVE HANDLE EXTENSION
Filed Oct. 27, 1934   2 Sheets-Sheet 1
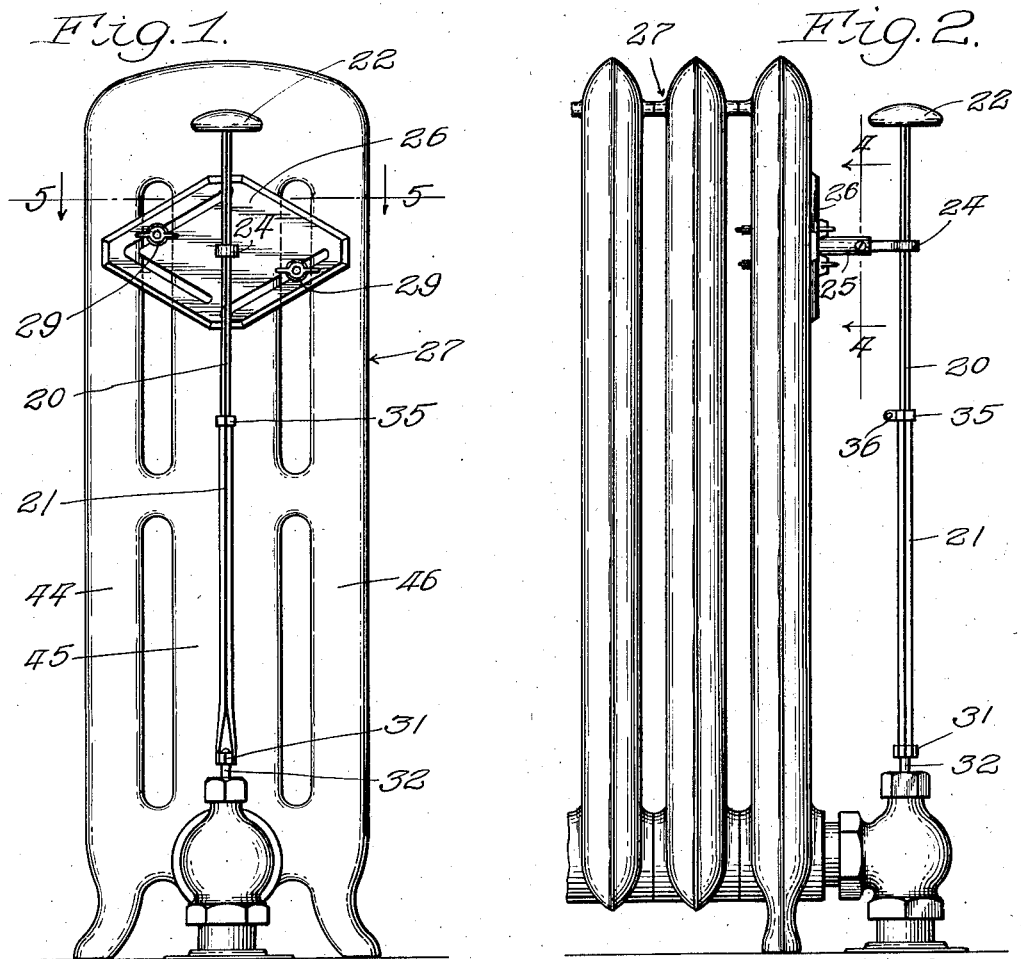
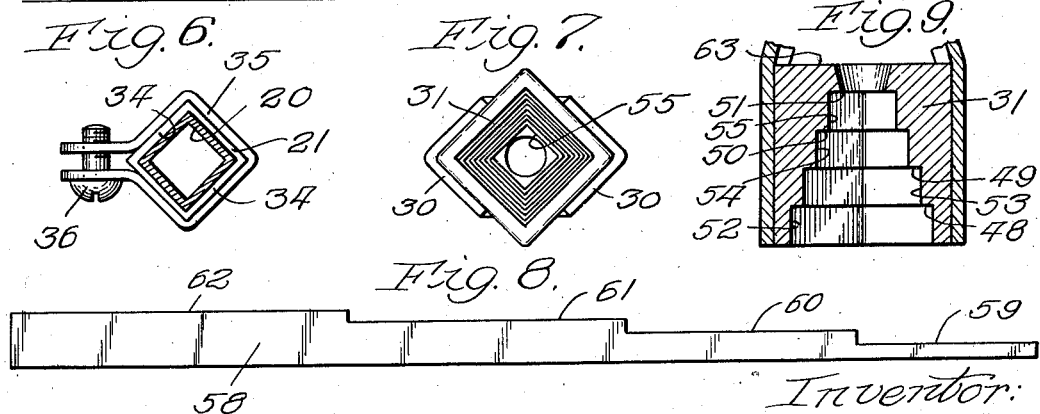
Inventor:
Edward C. Hoelscher,
By Dyrenforth, Lee, Chritton & Wiles,
Attys.

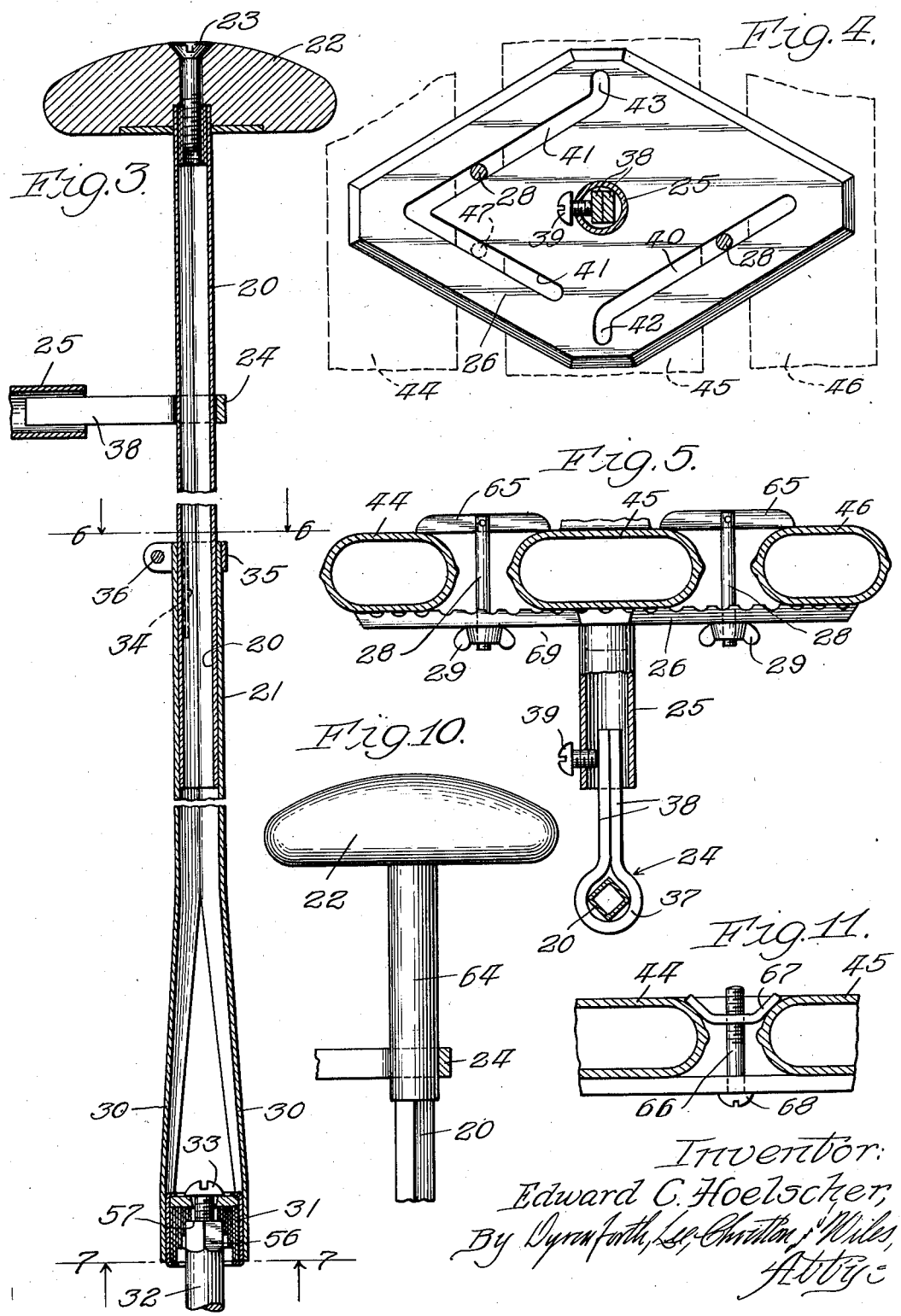

Patented Sept. 22, 1936

2,054,978

UNITED STATES PATENT OFFICE 2,054,978

VALVE HANDLE EXTENSION

Edward C. Hoelscher, Chicago, Ill.

Application October 27, 1934, Serial No. 750,365

2 Claims. (Cl. 287—119)

This invention relates to valve handle extension means, and more particularly to such an extension adapted for universal use in connection with a variety of sizes of standard valves.

The particular embodiment of my invention illustrated in connection herewith is a valve handle extension designed for use with radiators having their valve mechanism, controlling the admission of steam, hot water, or the like, at the lower end of the radiator.

One feature of this invention is that it renders the handle or manual valve operating means readily accessible to a person of average height; another feature of this invention is that it enables the valve mechanism to be operated without stooping; yet another feature of this invention is that it renders valves in the corner of a room, behind furniture, and the like, readily accessible; still another feature of this invention is that the one device is adapted to fit all radiators of various commercial heights, and all standard sizes of valve stems found in connection with such radiators; another feature of this invention is that it may be readily attached to a radiator of any number of columns or tubes, and with any ordinary horizontal spacing of the valve stem from said columns; still other features and advantages of this invention will be apparent from the following specification and the drawings, in which—

Fig. 1 is a vertical elevation of this invention in connection with a standard form of radiator; Fig. 2 is a side elevation of the same apparatus shown in Fig. 1; Fig. 3 is a more detailed view of the extension member and associated parts; Fig. 4 is an elevation of the attachment plate, along the lines 4—4 of Fig. 2; Fig. 5 is a horizontal sectional view along the line 5—5 of Fig. 1; Fig. 6 is a detailed view of the clamping means, along the lines 6—6 of Fig. 3; Fig. 7 is a sectional view along the line 7—7 of Fig. 3; Fig. 8 is a plan view of a strip adapted to form the attachment means; Fig. 9 is a vertical sectional view of another modification of the attachment means; Fig. 10 shows an alternative form of bearing means; and Fig. 11 illustrates another form of threaded clamping means.

In the particular embodiment of this invention illustrated herewith the valve handle extension comprises a shaft or bar 20 which slidably telescopes within a tube 21. The shaft is in the form of a polygon, and the tube 21 has a similar internal shape, as illustrated in Fig. 6. The shaft 20 has fastened to the top thereof a handle or knob 22, said handle being attached by any convenient means, as by the screw 23. A bearing member 24 forms a bearing for this shaft, and is adjustably received by a tube 25 which projects from a plate 26. The plate 26 is adapted to be held against the end face of the radiator 27 by any convenient means as by the threaded clamping means 28 and wing nut 29. The tube 21 has a split end with fork members 30 between which is fastened an attaching member 31 adapted to engage the valve stem 32 and to be fastened thereto by some convenient means, as the screw 33. It will be readily seen that such an extension enables the valve stem 32 to be conveniently, yet efficiently, rotated by means of the handle 22 positioned within easy reach of an operator.

The shaft 20 extending within the tube 21 is adapted to be telescoped therein to any desired position. In order that the widest range of longitudinal adjustment may be secured the tube 21 and shaft 20 are preferably of approximately the same length. The tube 21 has at one or more points near the upper end thereof a slot 34 therethrough. Surrounding the upper end of the tube is a clamping means 35 adapted to constrict the upper end of said tube when the screw 36, for example, is drawn tight. This constriction insures a tight connection between the tube and the shaft when said shaft has been positioned at the desired height.

In the particular construction shown, the bearing member 24 comprises a circular end portion 37 adapted to receive therein the shaft 20 and an extended supporting portion 38 adapted to be slidably recessed within the tube 25 and to be locked at any desired extended position by some locking means, as the set screw 39. The tube 25 projects outwardly from the surface of the plate 26 at the center thereof. The plate 26 is here shown as of approximately diamond shape, and having therein slots 40 and 41. These slots are adapted to receive therethrough the threaded portions of the clamping members 28. The slots 40 and 41 have turned ends 42 and 43 lying on the vertical center line of said plate, these end portions being adapted to receive clamping members 28 when the plate is used in connection with a radiator having only two columns. In the particular structure shown here the radiator 27 has three columns 44, 45 and 46. Such a radiator requires a horizontal spacing of the clamping means 28, which may be placed as illustrated in Fig. 4. If desired, however, one of said clamping members may be located at the point 47 in order that both clamps may be horizontally aligned. It is readily apparent that this particular construction of plate and clamping members enables the plate to be readily attached to any standard radiator, whether it has two, three, four, five, six, or seven columns. Where the radiator has an even number of columns the clamping means may, if desired, be located at the points 42 and 43. The formation of the slots permits the clamping members to be readily slid to the proper position for any radiator without removal from the plate 26.

The lower end of the tube 21 is split and branches into forks 30 in order to make the screw 33 easily accessible to a screw-driver. The attachment member 31 has within it a plurality of concentrically arranged squared portions, said portions being successively smaller, as illustrated in Fig. 9. This construction results in a plurality of shoulders, such as 48, 49, 50, and 51. Below each shoulder is a wall portion, as 52, 53, 54 and 55. The wall portion is adapted to engage the squared surface 56 of the usual valve stem 32, while the corresponding shoulder portion, as 50, is adapted to press down on the upper surface of the squared portion, as at 57. These walls and shoulders cooperate to form axially aligned sockets progressively decreasing in size. By arranging these sockets to correspond to the diameters of the various squared portions 56 found on standard valve stems used in connection with radiator valves or other valves, one attachment member 31 serves to engage the end of the tube 21 with the valve stem of any standard radiator.

In Figs. 7 and 8 one form of construction of such an attachment member is illustrated. A relatively long thin strip of metal, as 58, is cut so that it has portions of different widths. It will be noted in Fig. 8 that the strip 58 has a rather narrow section 59, a slightly larger section 60, a still larger section 61, and another larger section 62. If this metal strip is wrapped around a squared form of the smallest diameter stem to be found, starting with the end 59, a square spiral will be formed as illustrated in Fig. 7. Inasmuch as the strip has different widths at different portions thereof, a plurality of shoulders and differently spaced wall portions will be formed, resulting in sockets similar to the structure shown in Fig. 9. It will be noted that the sections are progressively longer, the ratio depending upon the diameter of the socket which each section is to form. Fig. 9, however, illustrates an alternative construction of the attachment means, that is, by casting or stamping one solid piece of metal into the required shape. The upper surface 63 forms a surface against which the head of the screw 33 may be drawn tight, thus pulling the upper surface 57 of the stem 32 into firm engagement with one of the shoulder portions, as 50.

Fig. 10 illustrates a modification securing better bearing contact between the shaft 20 and the bearing member 24. In this modification a round tube 64 is driven over the end of the shaft 20 in a forced fit and extends downward a short distance below the handle 22. By this means the bearing member 24 may be placed around the tube 64 and the end 37 of the bearing member will have a rounded surface within it, thus insuring a smoother rotating bearing surface.

Figure 5 illustrates one means whereby the plate 26 may be clamped to the radiator. It will be noted that the threaded clamping member projects between the columns, as between columns 44 and 45. This clamping means has at the back end thereof a standard toggle bar, as 65, which may be slipped through the space between the columns, turned, and then drawn into tight contact with the back of the columns 44 and 45 through rotation of the wing nut 29. An alternative construction is illustrated in Fig. 11, where the threaded member is illustrated as a screw 66 threaded into a curved bar, or member, 67, and adapted to be drawn up through the use of a screw-driver in connection with the head 68. In this modified form the bar 67 is curved in such a way as to have its surfaces engage the columns 44 and 45 in a manner which tends to prevent any possible slipping of the bar 67. As also illustrated in Fig. 5, the plate 26 may be formed with transverse parallel corrugations 69 on the back thereof. These corrugations, in combination with the rounded forward surfaces of the radiator columns, will prevent slipping or rotation of the plate 26.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new and desire to secure by Letters Patent is:

1. A coupling for attaching the end of the shaft of a valve handle extension to the polygonal valve stem of a radiator, said shaft having a split end, comprising a member having a plurality of axially aligned sockets therein progressively decreasing in size, said member being attached to the split end of said shaft and adapted to have at least one socket thereof held in operative engagement with said valve stem by a screw positioned between the forks of said split end and threaded into an axial opening in said stem.

2. Apparatus of the character claimed in claim 1 wherein said sockets are formed by a multi-layered polygonal roll of metal strip, said strip having at least two different widths.

EDWARD C. HOELSCHER.